Patented Sept. 20, 1938

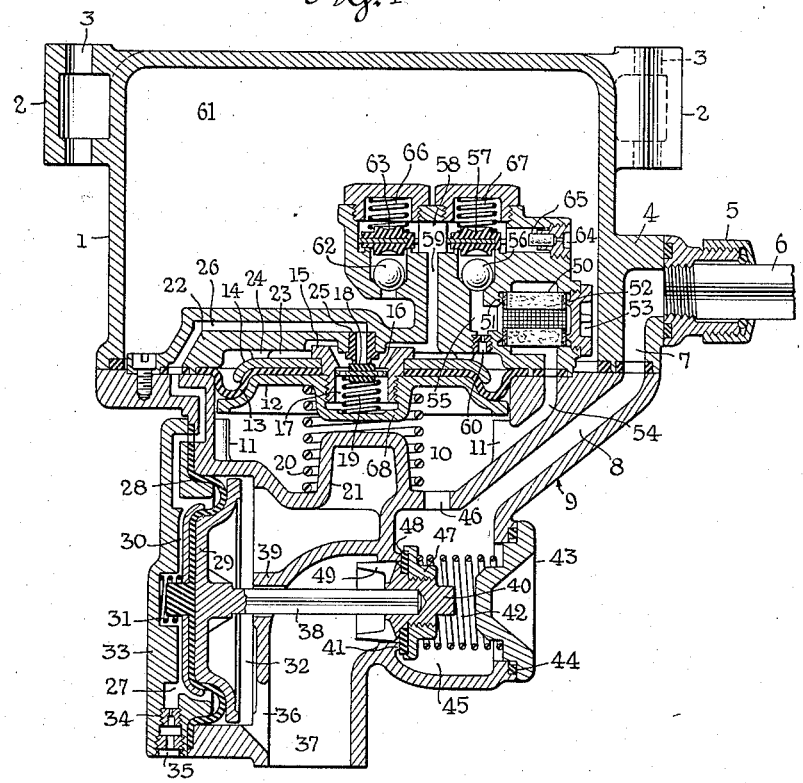

2,130,713

UNITED STATES PATENT OFFICE 2,130,713

AIR BRAKE

Charles A. Campbell, Watertown, N. Y., assignor to The New York Air Brake Company, a corporation of New Jersey Application December 21, 1937, Serial No. 181,040

13 Claims. (Cl. 303—82)

This invention relates to air brakes and particularly to emergency vent valves. While primarily intended for use on the locomotive near the engineer's brake valve, the vent valve involved in the present invention may be used in any situation where emergency venting is desired.

Emergency vent valves of the prior art fall generally into two classes. One class, exemplified by the patent to Campbell, No. 1,938,738, December 12, 1933, is characterized by the use of a quick action chamber separated from the brake pipe by a piston and acting directly in thrust on a normally closed poppet valve, which when opened vents the brake pipe. Chokes are used to control the charging of the quick action chamber and also the service back flow from this chamber to the brake pipe.

The second type, exemplified by the patent to Thomas, No. 1,384,930, July 19, 1921, has a quick action chamber separated from the brake pipe by a piston. This piston actuates a slide valve, which during service reductions controls the flow of air from the quick action chamber to the atmosphere and in emergency admits quick action chamber air to the piston motor of a brake pipe vent valve.

Both types above described have desirable features and are in extensive commercial use. They are adversely affected by moisture and dirt and they must be manufactured with considerable precision if they are to operate with certainty. Furthermore, there are inherent disturbing factors such as varying friction which tend to cause erratic action.

The present invention produces emergency valves which resemble the first type above mentioned to the extent that the charging of and back flow from the quick action chamber are controlled by chokes. It resembles the second type above mentioned to the extent that a primary abutment operates the valve, which in emergency admits quick action chamber air against a secondary abutment, which in turn opens the normally closed vent valve. It differs from the prior art of vent valves in that flexible diaphragms are used in place of pistons, with the result that greater sensitivity is secured without requiring an unusual degree of accuracy in manufacture. Another novel feature is that the primary abutment or diaphragm controls a valve of the poppet type rather than the slide type to admit quick action chamber air against the secondary abutment.

More than the mere substitution of the diaphragm for the piston is involved for the reason that the diaphragms require special arrangement in order to operate satisfactorily under the conditions encountered in service. To secure a diaphragm of large effective area for its size, a feature which is essential to sensitiveness, and to secure considerable range of diaphragm movement, it is desirable to use a slack diaphragm i. e. one with an annular corrugation. Such diaphragms are satisfactory when the pressure differential across the diaphragm acts in a single direction, but difficulty is encountered if the differential reverses, or at any rate if it reverses with an intensity sufficient to affect the corrugation. An important feature of the present invention is that the charging control chokes for the quick action chamber are so arranged that the main diaphragm is never subjected to a substantial pressure differential acting from the brake pipe toward the quick action chamber. To bring about this result the diaphragm is mounted so that it is exposed on one side to the brake pipe pressure and the other side to pressure in a chamber interposed in the path of flow from the brake pipe to the quick action chamber. The choke which controls charging is interposed between this chamber and the quick action chamber with the result that upon an initial rise of the brake pipe pressure, the pressures on opposite sides of the diaphragm equalize almost immediately. The preferred embodiment of the invention and one modification of a portion thereof I illustrate in the accompanying drawing.

In the drawing:

Figure 1 is a vertical section of the vent valve assembly in its normal release position.

Figure 2 is a partial section of the by-pass check valves, showing the opening of the back flow check during a service rate of brake pipe pressure reduction.

Figure 3 is a similar partial section showing the opening of the by-pass check during initial charging of the vent valve or following the admission of air to the brake pipe during a release after a brake application.

Figure 4 is a similar partial section showing an alternative construction for that shown in Figures 2 and 3 wherein a double throw check valve is substituted for the pair of dual check valves.

Referring to Figure 1, the vent valve chamber and bracket is indicated by the numeral 1, and includes a plurality of bolting lugs 2 drilled at 3 to receive bolts by which the reservoir is suspended from any suitable support. The body 1 is provided with a pad 4 to which is bolted a reinforced flange union fitting, generally designated by the numeral 5, and pipe to this fitting is a brake pipe branch pipe 6 which leads from the brake pipe running throughout the length of the locomotive. The body 1 is cored at 7 to provide communication with the brake pipe passage 8, located in the lower body 9. The lower body is chambered at 10 on its upper side and provided with four stop lugs 11 which define the lower limit of travel of an abutment 12 mounted against the under side of the diaphragm 13. The diaphragm 13 is provided with a cover plate 14 on its upper side, while a shouldered nut 15 is threaded into the boss 68 at the center of plate 12 and serves to retain the members 12, 13 and 14 securely clamped together. The nut 15 is provided with a shoulder 16 and is bored at 17 to receive a valve 18 constantly urged toward the shoulder 16 by a relatively light compression spring 19. The abutment 12 is urged upward by a spring 20, guided and retained on its lower end by a boss 21 and on its upper end by a boss 68 formed on the lower side of abutment 12.

The diaphragm 13 is housed on its upper side by a cover plate 22 which is recessed at 23 and provided with a plurality of standoff lugs 24, two of which are visible in the drawing. These lugs limit upward travel of the diaphragm assembly. The cover 22 is bored centrally to receive a valve seat bushing 25 which is closed by the valve 18 when the abutment plate 14 contacts the standoff lugs 24. In this position a flange on the valve member 18 stands slightly below the shoulder 16 so as to limit the upward thrust on valve 18 to the tension of spring 19. The seat bushing 25 is centrally drilled to provide communication with the passage 26 which leads to chamber 27 on the outer face of a second diaphragm 28. This diaphragm is similar in construction to the diaphragm 13 and is supported by a combined abutment and thrust member 29 on its inner side, and a cover plate 30 on its outer side. A comparatively weak spring 31 urges the diaphragm assembly to the right. The body 9 is recessed at 32 to permit limited inward travel of the abutment 29 which is housed on its outer side by a removable cover plate 33.

The chamber 27 is vented to atmosphere through a choke 34 having the outer end of the choke passage fitted with a wasp excluder 35. The space 32 to the right of the abutment 29 is connected by cored passage 36 to the main exhaust passage 37. The abutment 29 has a stem 38 which extends through a baffle partition 39 and the exhaust passage 37. The stem is concentric and in thrust relation with an exhaust valve 40 urged to its seat 41 by a comparatively heavy loading spring 42 retained and centered by a cap 43. The cap is sealed by a gasket 44. The chamber 45, surrounding the valve 40, is in direct communication with the brake pipe inlet passage 8 and with the chamber 10 beneath the diaphragm 13 through passage 46, and thus the chamber 45 is the lowest point in the brake pipe passage so that any water, dust, oil, etc., will be lodged in this chamber.

The valve 40 comprises a head 47, threaded on the valve member 40 to retain a resilient gasket 48. The member 40 is provided with four guide wings 49 which project through the seat 41 and into the chamber 37. These lugs are slightly tapered on their outer diameter so as to permit limited tilt to the gasket 48 to ensure seal with seat 41. The member 40 is centrally bored to receive the stem 38.

It should be observed that the valve 40 is not guided within the chamber 45 where there is risk that dirt or other foreign substance precipitated in this chamber may prevent a proper alignment of the valve with relation to its seat. The valve is guided within the bore of seat 41 which invariably is kept clean by the rush of air and fine particles of foreign substance through it during emergency venting.

Mounted on the cover plate 22 are dual check valve assemblies and an inflow filter. The filter is indicated at 50, and is sealed on its left end by an annular bead 51 formed in the body and on its right end by an annular bead 52 formed on the inner face of cap nut 53. The space surrounding the filter 50 is connected by passage 54 to the brake pipe chamber 10 beneath the diaphragm 13, while the space within the filter is connected by passage 55 to the space beneath the ball check 56. Above this is a rubber-seated check valve 57. The space 58 above the check 57 is connected by passage 59 to the chamber 23 above the diaphragm 13. Passage 55 is also connected directly to chamber 23 through the stabilizing choke 60, so as to permit air from chamber 23 to flow back to the brake pipe passage 54 at a service rate without creating sufficient differential across the diaphragm 13 to overcome spring 20.

The vent valve chamber is shown at 61 and opens to the under side of the second ball check valve 62, the space above which is at the under side of a rubber-seated check valve 63. The space above the rubber-seated check valve is the chamber 58 which is in free communication with the space 23 above the diaphragm 13. Thus, the checks 62 and 63 permit free flow from the chamber 61 to the chamber 23 and the checks 57 and 56 close against flow from the vent valve chamber to the brake pipe. The purpose of providing check valves 56 and 57 is to limit the pressure differential across the diaphragm 13 during initial charging so as to prevent damage to the diaphragm, while the purpose of the checks 62 and 63 is to combine the chambers 61 and 23 during a reflux to the brake pipe so as to flood the choke 60 and create a differential across the diaphragm 13 if the rate of brake pipe pressure drop exceeds a predetermined service rate.

The chamber 58 is directly connected to the vent valve chamber 61 through a restricted charging choke plug 64 having its inlet (left side) protected by a felt filter pellet 65. Thus, the choke 64 governs the rate of vent valve chamber charging, while choke 60 governs the rate of vent valve chamber reflux to the brake pipe to provide the proper stability of the valve. Check valves 63 and 57 are urged to their respective seats by light springs 66 and 67.

*Operation*

During initial charging, brake pipe air enters the pipe connection, passes through passages 7 and 8 to the chamber 45, and through passage 46 to the chamber 10, forcing the abutment 12 and diaphragm 13 upward until the plate 14 contacts the stops 24. In this position valve 18 seals on seat 25 under the constant urge of spring 19. The diaphragm 13 is retained in this uppermost position by spring 20. Brake pipe air flows through passage 54, through the filter 50 and passage 55, past the checks 56 and 57 to the chamber 58 from whence it flows through passage 59 to the chamber 23 above the diaphragm 13, thus quickly equalizing the pressures above and below the diaphragm. At the same time brake pipe air flows through stabilizing choke 60 to assist in establishing such equalization.

Air from chamber 58 flows through the felt filter 65 and choke 64 to the chamber 61 charging this chamber at a restricted rate. Check valves 63 and 62 are retained on their seats so as to limit the rate of vent valve chamber charge to the capacity governed by choke 64. Check valves of this type in series provide exceptionally tight seals.

The brake pipe vent valve 40 is retained on its seat 41 by spring 42. The space 27 to the left of diaphragm 28 is vented to atmosphere by choke 34.

*Service application*

Air pressure in the brake pipe passage 54 is reduced at a service rate so that air from passage 55 flows back to the brake pipe. Air from the chamber 61 lifts checks 62 and 63 from their seats, permitting vent valve chamber air to pass through passages 58 and 59 to the chamber 23, whence it flows through choke 60, passage 55, and strainer 50 to the brake pipe passage 54. Air from the vent valve chamber also passes through choke plug 64 and filter 65 to the chamber 58 where it joins with the air flowing past the check valves 62 and 63. It follows that the air pressure in chamber 23 above the diaphragm 13 falls at a rate which will prevent the development of sufficient differential pressure across the diaphragm to cause opening of the valve 18. Check valves 56 and 57 close, thus limiting the rate of air flow to the capacity of choke 60.

*Emergency application*

If there is a sudden reduction of pressure in the brake pipe passages 7 and 8, there will be a similar reduction of pressure in chamber 10 beneath the diaphragm 13 and air will flow back to the brake pipe through the stabilizing choke 60 as above described for service application. However, the capacity of choke 60 is so limited that the pressure in chamber 23 cannot fall rapidly enough to keep pace with the rate of pressure reduction in chamber 10, so that sufficient pressure differential will build up across the diaphragm 13 to overcome the resistance offered by spring 20. Hence the diaphragm is forced downward and unseats the valve 18. Air from chamber 23 and the vent valve chamber 61 flows through passage 26 to the chamber 27 on the outer face of the diaphragm 28. This forces the diaphragm to the right, carrying with it the abutment 29 and stem 38, unseating the valve 40 and permitting direct flow of brake pipe air from chamber 45 to the exhaust passage 37.

Air from the vent valve chamber 61 will now flow to the atmosphere through choke 34 until the pressure in this chamber drops to a predetermined value, at which time the spring 42 will force valve 40 to its seat 41 to close communication between chambers 45 and 37. Air will continue to vent to the atmosphere through choke 34 until the spring 20 moves the diaphragm 13 upward to seal the valve 18 on its seat 25, at which time the air pressure in passages 26 and 27 is quickly dissipated to atmospheric. The valve is now in condition for recharge.

An alternative construction for the two pairs of check valves is shown in Fig. 4 wherein the brake pipe passage 55a, similar to port 55, leads to the under side of the double throw check valve 156 which seats on gasket 157, while the upper end of the check valve normally seats on gasket 162 retained in place by a nut 163. The valve 156 is slidably mounted within a bushing 161 provided with dual ports which communicate with an annular recess 58a which is functionally similar to chamber 58 and hence leads through passage 59a to the chamber 23a above the diaphragm. The charging choke plug is shown at 64a and includes the felt filter pellet 65a. As in the case with Figs. 2 and 3, the charging choke plug 64a leads directly from the passage 58a to the vent valve chamber 61 and the recession choke 60a governs the rate of back flow from chamber 23a to the passage 55a.

In Fig. 4 parts similar to those in Figs. 1–3 are given the same reference numeral with the letter a.

*Charging during initial charging*

Air enters the brake pipe passage 54a, flows through the filter 50a to the passage 55a, forcing the double throw check upward to seal on gasket 162, thereby preventing a direct high capacity flow to the vent valve chamber 61a. Air now flows from passage 55a to the annular space 58a and thence through passage 59a to the chamber 23a above the diaphragm. Air also flows through stabilizing choke 60a. The vent valve chamber charging is governed by the capacity of choke 64a.

*Service application*

During a service rate of brake pipe pressure reduction air flows back from the brake pipe passages 54a and 55a, permitting the check valve 156 to seal on gasket 157, in which position air from the vent valve chamber flows through nut 163 and bushing 161 to the space 58a, thence through passage 59a to the chamber 23a. Air also flows through charging choke 64a to the chamber 58a. Air now flows back to the brake pipe through stabilizing choke 60a permitting air pressure in the vent valve chamber to be reduced at a rate to keep pace with the rate of brake pipe pressure reduction without creating a sufficient differential across the diaphragm 13 to open the valve 18.

*Emergency application*

During an emergency rate of brake pipe pressure reduction air from the vent valve chamber 61a cannot flow back to the brake pipe through choke plug 60a fast enough to keep pace with the rate of brake pipe pressure reduction and sufficient pressure differential will be quickly built up across the diaphragm 13 to open the valve 18 and initiate emergency as formerly described.

The double throw check valve 156 performs selectively the selective check valve function of the two groups of check valves 62, 63 and 56, 57. In initial charging with either embodiment, the pressures on the main diaphragm are quickly equalized and choke 64 (or its analog 64a) controls charging flow to the quick action chamber. Choke 60 (or its analog 60a) controls back flow to the brake pipe from the quick action chamber and thus establishes the differentiation between service and emergency responses.

What is claimed is:

1. The combination of a brake pipe; a normally closed brake pipe vent valve; means forming a brake pipe chamber in free communication with the brake pipe, a diaphragm chamber and a quick action chamber; a flexible diaphragm separating the diaphragm chamber and the brake pipe chamber; means operable by displacement of the diaphragm toward the brake pipe chamber to cause opening of said vent valve; yielding means resisting such displacement; means offering a restricted communication between the brake pipe and the diaphragm chamber; means offering a more restricted communication between the diaphragm chamber and the quick action chamber; and one way flow valve means for permitting rapid flow from the quick action chamber to the diaphragm chamber.

2. The combination of a brake pipe, a normally closed brake pipe vent valve; means forming a brake pipe chamber in free communication with the brake pipe, a diaphragm chamber and a quick action chamber; a flexible diaphragm separating the diaphragm chamber and the brake pipe chamber; means operable by displacement of the diaphragm toward the brake pipe chamber to cause opening of said vent valve; yielding means resisting such displacement; means offering a restricted communication between the brake pipe and the diaphragm chamber; means offering a more restricted communication between the diaphragm chamber and the quick action chamber; and valve means operable to permit selectively free flow from the brake pipe, or free flow from the quick action chamber to the diaphragm chamber, but closing against reverse flows.

3. The combination of a brake pipe; a normally closed brake pipe vent valve; means forming a brake pipe chamber in free communication with the brake pipe, a diaphragm chamber and a quick action chamber; a flexible diaphragm separating the diaphragm chamber and the brake pipe chamber; means operable by displacement of the diaphragm toward the brake pipe chamber to cause opening of said vent valve; yielding means resisting such displacement; means offering a restricted communication between the brake pipe and the diaphragm chamber; means offering a more restricted communication between the diaphragm chamber and the quick action chamber; one way flow valve means for permitting free flow from the brake pipe to the diaphragm chamber; and one way valve means for permitting free flow from the quick action chamber to the diaphragm chamber.

4. The combination of a brake pipe; a brake pipe vent valve; yielding means urging said valve closed; a pressure motor for forcing said valve open, such motor having a restricted vent; means forming a brake pipe chamber in free communication with the brake pipe, a diaphragm chamber, and a quick action chamber; a flexible diaphragm separating the diaphragm chamber and the brake pipe chamber; a normally closed poppet valve controlling flow from the quick action chamber to said pressure motor, and arranged to be opened by displacement of said diaphragm toward the brake pipe chamber; yielding means resisting such displacement; means offering a restricted communication between the brake pipe and the diaphragm chamber; means offering a more restricted communication between the diaphragm chamber and the quick action chamber; and one way flow valve means for permitting rapid flow from the quick action chamber to the diaphragm chamber.

5. The combination of a brake pipe; a brake pipe vent valve; yielding means urging said valve closed; a pressure motor for forcing said valve open, such motor having a restricted vent; means forming a brake pipe chamber in free communication with the brake pipe, a diaphragm chamber, and a quick action chamber; a flexible diaphragm separating the diaphragm chamber and the brake pipe chamber; a normally closed poppet valve controlling flow from the quick action chamber to said pressure motor, and arranged to be opened by displacement of said diaphragm toward the brake pipe chamber; yielding means resisting such displacement; means offering a restricted communication between the brake pipe and the diaphragm chamber; means offering a more restricted communication between the diaphragm chamber and the quick action chamber; and valve means operable to permit selectively free flow from the brake pipe, or free flow from the quick action chamber to the diaphragm chamber, but closing against reverse flows.

6. The combination of a brake pipe; a brake pipe vent valve; yielding means urging said valve closed; a pressure motor for forcing said valve open, such motor having a restricted vent; means forming a brake pipe chamber in free communication with the brake pipe, a diaphragm chamber, and a quick action chamber; a flexible diaphragm separating the diaphragm chamber and the brake pipe chamber; a normally closed poppet valve controlling flow from the quick action chamber to said pressure motor, and arranged to be opened by displacement of said diaphragm toward the brake pipe chamber; yielding means resisting such displacement; means offering a restricted communication between the brake pipe and the diaphragm chamber; means offering a more restricted communication between the diaphragm chamber and the quick action chamber; one way flow valve means for permitting free flow from the brake pipe to the diaphragm chamber; and one way valve means for permitting free flow from the quick action chamber to the diaphragm chamber.

7. The combination defined in claim 2 in which the selective valve means comprises check valves opening toward the diaphragm chamber from the quick action chamber and brake pipe respectively.

8. The combination defined in claim 2 in which the selective valve means is a double throw check valve responsive to reversal of the pressure differential between brake pipe and quick action chamber.

9. The combination defined in claim 4 in which the pressure motor is of the diaphragm type.

10. The combination of a brake pipe; a normally closed brake pipe vent valve; means forming a brake pipe chamber in free communication with the brake pipe, a diaphragm chamber and a quick action chamber; a flexible diaphragm separating the diaphragm chamber and the brake pipe chamber; means operable by displacement of the diaphragm toward the brake pipe chamber to cause opening of said vent valve; yielding means resisting such displacement; means offering a restricted communication between the brake pipe and the diaphragm chamber; means offering a more restricted communication between the diaphragm chamber and the quick action chamber; and a selector valve responsive to the pressure differential between brake pipe and quick action chamber and serving to subject the diaphragm chamber to the dominant pressure.

11. The combination of a brake pipe, a normally closed brake pipe vent valve; means forming a quick action chamber; a diaphragm interposed between the quick action chamber and said brake pipe; two flow-restricting means of different capacity interposed in paths of flow between the brake pipe and said quick action chamber; pressure responsive valve means serving to cause one of said restricting means to control charging flow from the brake pipe to the quick action chamber, and to cause the other of said restricting means to control reflux from the quick action chamber to the brake pipe, said pressure responsive valve means serving to assure substantial equalization of pressure on said diaphragm during charging flow; means operable by the displacement of the diaphragm by predominant quick action chamber pressure to cause opening of said vent valve; and yielding means resisting such displacement.

12. The combination defined in claim 11 in which the diaphragm is of the slack type, having an annular fold to increase its range of operation and effective area.

13. The combination defined in claim 10 in which the "means operable by the displacement of the diaphragm by predominant quick action chamber pressure to cause opening of said vent valve" comprises a controlling valve arranged to be opened by such displacement of the diaphragm; and a diaphragm motor arranged to open said vent valve when the motor is energized, said controlling valve controlling flow of pressure fluid from the quick action chamber to said motor to energize the same.

CHARLES A. CAMPBELL.